US005743011A

United States Patent [19]

Dickerson et al.

[11] Patent Number: 5,743,011

[45] Date of Patent: Apr. 28, 1998

[54] PROCESS OF MANUFACTURING VEHICLE MANIFOLDS

[75] Inventors: Devere Carl Dickerson, Hamburg; Brian Stephen Anderson, Plymouth, both of Mich.

[73] Assignee: Mascotech Tubular Products, Inc., Canton, Mich.

[21] Appl. No.: 606,127

[22] Filed: Feb. 23, 1996

[51] Int. Cl.$^6$ .................... B23P 15/00

[52] U.S. Cl. .................... 29/888.01; 29/890.08

[58] Field of Search .................... 29/890.08, 469.05, 29/888.01; 123/184.21

[56] References Cited

U.S. PATENT DOCUMENTS

| | | | |
|---|---|---|---|
| 3,944,261 | 3/1976 | Reed et al. | 29/890.08 |
| 4,022,019 | 5/1977 | Garcea | 29/890.08 |
| 4,301,775 | 11/1981 | Smart et al. . | |
| 4,352,772 | 10/1982 | Bezner . | |
| 4,359,812 | 11/1982 | Haag et al. | 29/469.5 |
| 4,537,027 | 8/1985 | Harwood et al. | 29/890.08 |
| 4,689,191 | 8/1987 | Beck et al. . | |
| 4,740,344 | 4/1988 | Wollbeck et al. . | |
| 4,803,962 | 2/1989 | Asai . | |
| 4,805,564 | 2/1989 | Hudson, Jr. . | |
| 4,864,978 | 9/1989 | Fukazawa . | |
| 4,887,537 | 12/1989 | Sukimoto et al. . | |
| 4,887,557 | 12/1989 | Sukimoto et al. | 29/890.08 |
| 4,935,177 | 6/1990 | Theising . | |
| 4,990,206 | 2/1991 | Garske et al. . | |
| 5,016,578 | 5/1991 | Ogawa et al. . | |
| 5,554,244 | 9/1996 | Ruggles et al. | 156/196 |

*Primary Examiner*—Irene Cuda

*Attorney, Agent, or Firm*—Edgar A. Zarins; Malcolm L. Sutherland

[57] ABSTRACT

A process of manufacturing vehicle manifolds particularly for attaching the manifold tubes to the base plate which is used to secure the manifold to the engine block. The manifold assembly includes a plurality of manifold tubes having at least one end secured to the base plate. The tubes are secured to the plate in groups utilizing a pool of epoxy isolated along the base plate by a ridge. The liquified epoxy flows around the tubes to secure the tubes within the plate once the epoxy is cured and hardened.

18 Claims, 1 Drawing Sheet

PROCESS OF MANUFACTURING VEHICLE MANIFOLDS

BACKGROUND OF THE INVENTION

I. Field of the Invention

This invention relates to a method of manufacturing intake manifolds for vehicle engines and, in particular, to a process of economically and efficiently securing the tubes of the manifold to a base mounting plate.

II. Description of the Prior Art

Vehicle engines require intake manifolds for delivering combustion air to the engine. As the number of ports and valves increases in modern engines, the complexity of such manifolds also increases. A greater number of tubes are used in manifolds to distribute the air resulting in space constraints which makes manufacturing more complex. The typical manifold incorporates a plurality of tubes secured to a base mounting plate which is used to removably attach the manifold to the engine block. The tubes must be reliably secured to the base plate to prevent dislodgement under the vibrations of the engine and to prevent leakage past the tubes which can degrade operation of the engine.

One prior known method of securing the manifold tubes to the base plate includes applying a bead of epoxy around the tube where it joins the base plate. The tube is held against the base plate as the epoxy bead is applied to the periphery of the tube. However, this method has been found to be extremely time consuming and therefore costly because of the required precision. Nevertheless, vehicle manufacturers are calling for an epoxy seal around the tubes of the manifold.

SUMMARY OF THE INVENTION

The present invention overcomes the disadvantages of the prior known vehicle manifolds by providing a manufacturing process which reliably and economically secures the manifold tubes to the base mounting plate.

The process of manufacturing vehicle manifolds includes providing a base plate with a predetermined arrangement of apertures to which manifold tubes will be mounted. The apertures are grouped within a basin defined by a ridge formed directly in the base plate. The top of the ridge is a predetermined level above the body of the base plate. The ends of the tubes are matingly inserted into the apertures to join the tubes with the base plate. Both the base plate and an epoxy material are heated to a predetermined temperature before the epoxy is poured into the "dammed" basin of the base plate formed by the ridge. The epoxy flows throughout the basin including around each of the tubes mounted within the periphery of the ridge. Upon curing the epoxy, the tubes will be securely mounted to the base plate. The method of the present invention improves manufacture of the manifolds by securing a plurality of manifold tubes during each of the process steps. Furthermore, the precision of the prior known methods is eliminated since the epoxy is allowed to flow around the individual tubes. Mounting can be further enhanced by providing a shoulder within the apertures of the base plate facilitating mating engagement of the tubes within the plate.

Other objects, features, and advantages of the invention will be apparent from the following detailed description taken in connection with the accompanying drawings.

BRIEF DESCRIPTION OF THE DRAWINGS

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
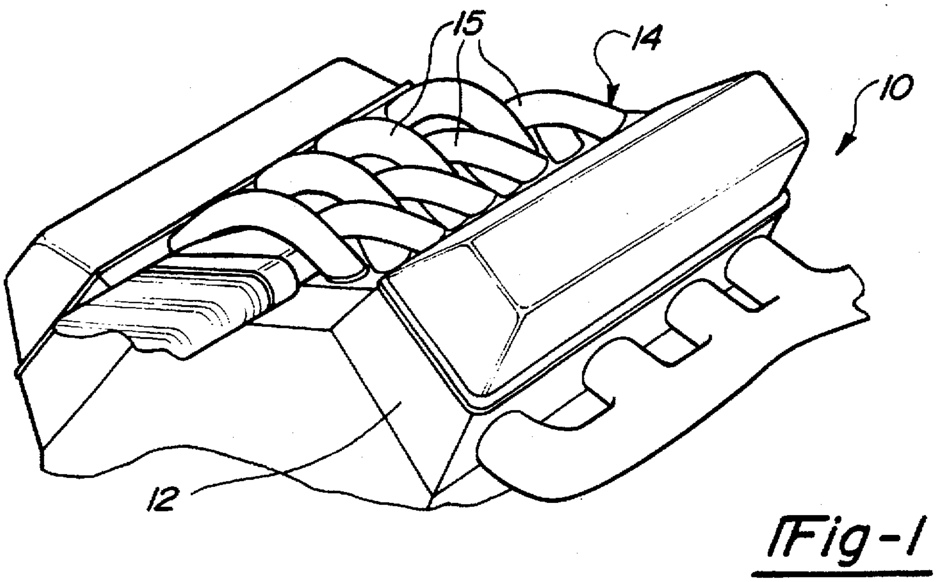
FIG. 1 is a partial perspective view of a vehicle engine having a manifold with a plurality of manifold tubes manufactured using the process of the present invention.

Referring to the drawings, there is shown a partial perspective of a vehicle engine 10 with an engine block 12. Mounted to the cylinder head 12 is a manifold assembly 14 manufactured using the process of the present invention. The manifold assembly 14 includes a plurality of manifold tubes 15 for directing combustion gases according to the operational requirements of the engine 10. The process of the present invention process a novel and economical method of assembling the manifold 14 for use with the vehicle engine 10.

Figure 2:
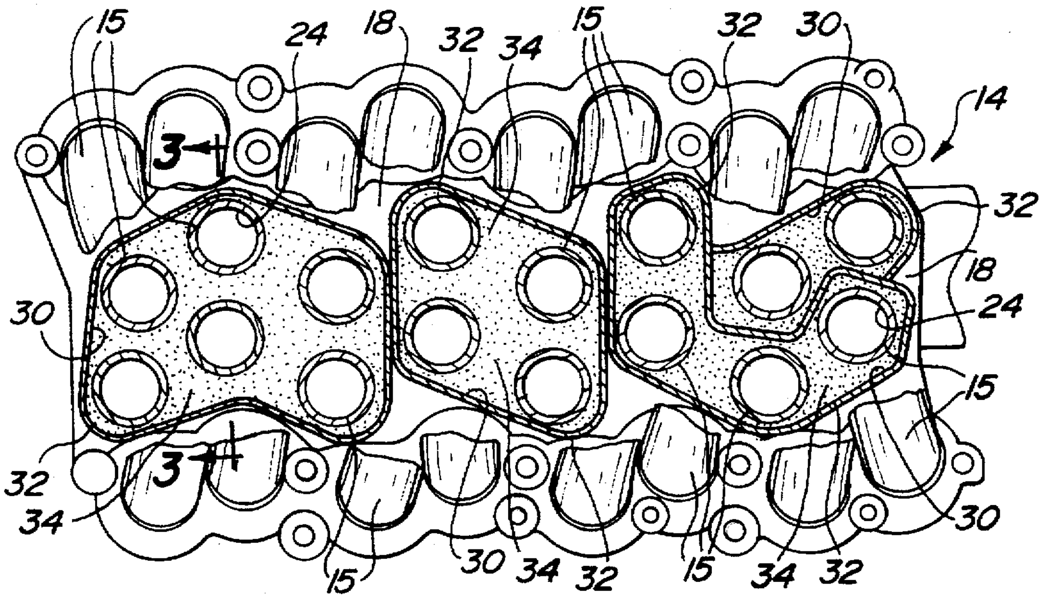
FIG. 2 is an overhead cross-sectional view of the vehicle engine.
Figure 3:
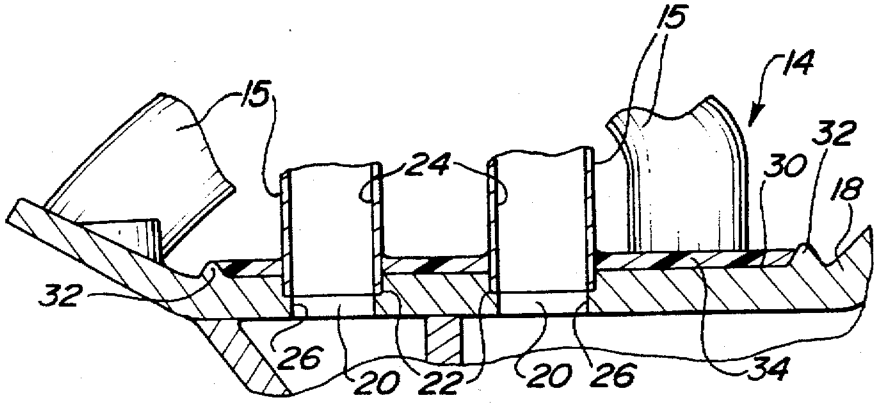
FIG. 3 is a partial transverse cross-sectional view of the engine and manifold showing the manifold tubes mounted to the base plate.

Referring now to FIGS. 2 and 3, the manifold assembly 14 includes the plurality of manifold tubes 15 mounted to a base plate 18 which is utilized to secure the manifold 14 to the cylinder head 12. The base plate 18 is provided with a plurality of throughbores 20 corresponding to the number of tubes 15. The tubes 15 are preferably matingly received within the throughbores 20 as shown in FIG. 3. In order to facilitate proper insertion of the tubes 15 within the throughbore 20, an annular shoulder 22 is formed in the throughbore 20. As a result, the inner diameter 24 of the manifolds tubes 15 aligns with the reduced diameter portion 26 of the throughbores 20 so as not to disturb the flow of gases through the manifold 14.

Formed in the upper surface of the base plate 18 is at least one basin 30 defined by a raised ridge 32 surrounding a group of throughbores 20 and subsequently manifold tubes 15. The ridge 32 creates a dam surrounding the grouping of tubes 15. Preferably, the ridge 32 is integrally formed with the base plate 18 although the ridge 32 may be added to the surface of the plate 18 through well known methods. The important aspect is that the ridge 32 form an enclosed basin 30 on the surface of the plate 18.

The process of assembling the manifold 14 will now be described in conjunction with the components identified herein. The base plate 18 is provided having a plurality of throughbores 20 surrounded by the ridge 32 forming the basin 30. Manifold tubes 15 are inserted into the throughbores 20 to connect the tubes 15 to the plate 18. The base plate 18 is heated to a predetermined temperature preferably approximately 180° F. An epoxy material is also heated to a predetermined temperature, preferably approximately 180° F. The molten or liquified epoxy is dropped into the dammed basin 30 of the base plate 18 to flow throughout the basin 30 and surround the manifold tubes 15 grouped within the basin 30. An epoxy pool 34 is formed within the basin 30 which fully surrounds the individual tubes 15. The entire manifold assembly 14 is heated to approximately 350° F. to 400° F. which cures the epoxy 34 securing the manifold tubes 15 to the base plate 18. Since a plurality of manifold tubes 15 are secured during a single application of epoxy, the intricacy, cost and length of manufacture are all reduced.

The foregoing detailed description has been given for clearness of understanding only and no unnecessary limitations should be understood therefrom as some modifications will be obvious to those skilled in the art without departing from the scope and spirit of the appended claims.

What is claimed is:

1. A process of manufacturing manifolds for vehicle engines comprising the steps of:

providing a base plate having a plurality of throughbores matingly receiving a corresponding plurality of manifold tubes;

forming a raised ridge on said base plate, said ridge surrounding at least one throughbore with a manifold tube to form a basin within said raised ridge;

introducing a predetermined quantity of adhesive to said basin formed by said ridge to substantially fill said basin, said adhesive circumscribing said at least one manifold tube within said basin; and curing said adhesive to secure said at least one manifold tube to said base plate.

2. The process as defined in claim 1 and comprising the further step of forming an annular shoulder within said throughbores to limit the mating engagement of said tubes into said throughbores.

3. The process as defined in claim 1 and comprising the further step of heating said base plate to a predetermined temperature prior to introduction of said adhesive.

4. The process as defined in claim 3 wherein said base plate is heated to a temperature of 180° F.

5. The process as defined in claim 3 wherein said adhesive is heated to the same temperature as said base plate to facilitate flow of said adhesive throughout said basin.

6. The process as defined in claim 5 wherein said adhesive is an epoxy adhesive.

7. The process as defined in claim 6 wherein said epoxy adhesive is cured by raising the temperature of said epoxy adhesive within said basin to a predetermined temperature.

8. The process as defined in claim 7 wherein said epoxy adhesive is heated to a temperature range of 350° F. and 400° F. to cure the epoxy adhesive.

9. The process as defined in claim 1 wherein said raised ridge on said base plate surrounds a plurality of throughbores with a manifold tube.

10. A process of manufacturing manifolds for vehicle engines comprising the steps of:

providing a base plate having a plurality of throughbores matingly receiving a corresponding plurality of manifold tubes;

forming a raised ridge on said base plate, said ridge surrounding at least two throughbores with a manifold tube to form a basin within said raised ridge;

introducing a predetermined quantity of molten adhesive to said basin formed by said ridge to substantially fill said basin, said molten adhesive flowing throughout said basin circumscribing said at least two manifold tubes within said basin; and curing said molten adhesive to secure said at least two manifold tubes to said base plate.

11. The process as defined in claim 10 and comprising the further step of heating said base plate to a predetermined temperature prior to introduction of said adhesive.

12. The process as defined in claim 11 wherein said base plate is heated to a temperature of 180° F.

13. The process as defined in claim 11 wherein said adhesive is an epoxy adhesive.

14. The process as defined in claim 13 wherein said epoxy adhesive is cured by raising the temperature of said epoxy adhesive within said basin to a predetermined temperature.

15. A process of manufacturing manifolds for vehicle engines comprising the steps of:

providing a base plate having a plurality of throughbores matingly receiving a corresponding plurality of manifold tubes;

forming a raised ridge on said base plate, said ridge surrounding at least two throughbores with a manifold tube to form a basin within said raised ridge;

heating said base plate to a predetermined temperature;

heating an epoxy adhesive to a predetermined temperature to at least partially liquify said epoxy adhesive and introducing said epoxy adhesive to said basin such that said epoxy flows around said manifold tube and fills said basin; and curing said epoxy adhesive by raising the temperature of said epoxy adhesive thereby securing said manifold tubes to said base plate.

16. The process as defined in claim 15 wherein said epoxy adhesive is heated to the same temperature as said base plate.

17. The process as defined in claim 16 wherein said base plate and epoxy adhesive are heated to substantially 180° F.

18. The process as defined in claim 15 wherein said temperature of said epoxy adhesive is raised to a temperature in the range of 350° F. to 400° F. to cure said epoxy.

* * * * *